United States Patent
Ro et al.

(10) Patent No.: US 6,559,250 B2
(45) Date of Patent: May 6, 2003

(54) METHOD OF HOMO- OR CO-POLYMERIZATION OF α-OLEFIN

(75) Inventors: Ki-Su Ro, Taejon-shi (KR); Il-Seop Kim, Taejon-shi (KR); Chun-Byung Yang, Taejon-shi (KR); Moon-Young Shin, Taejon-shi (KR)

(73) Assignee: Samsung General Chemicals Co., Ltd. (KR)

( * ) Notice: Subject to any disclaimer, the term of this patent is extended or adjusted under 35 U.S.C. 154(b) by 83 days.

(21) Appl. No.: 09/871,253

(22) Filed: May 30, 2001

(65) Prior Publication Data

US 2002/0120079 A1 Aug. 29, 2002

(30) Foreign Application Priority Data

Dec. 27, 2000 (KR) .......................................... 2000-82663

(51) Int. Cl.$^7$ ................................................. C08F 4/44
(52) U.S. Cl. .................. 526/124.3; 526/348; 526/125.3; 526/128; 526/125.1; 526/124.9; 526/139; 526/140; 526/154; 526/158; 502/118; 502/121; 502/125; 502/116; 502/103
(58) Field of Search ........................ 526/123.1, 348, 526/124.3, 125.3, 128, 125.1, 124.9, 139, 140, 154, 158; 502/118, 121, 125, 116, 103

(56) References Cited

U.S. PATENT DOCUMENTS

| 3,878,124 A | 4/1975 | Durand et al. |
| 4,069,169 A | 1/1978 | Toyoda et al. |
| 4,071,672 A | 1/1978 | Kashiwa |

(List continued on next page.)

FOREIGN PATENT DOCUMENTS

| DE | 2 153 520 | 5/1972 |
| DE | 2 230 672 | 12/1972 |
| DE | 2 230 728 | 12/1972 |
| DE | 2 230 752 | 12/1972 |
| DE | 26 05 922 | 8/1976 |
| DE | 25 53 104 | 6/1977 |
| DE | 25 04 036 | 8/1978 |
| EP | 0 350 170 | 3/1994 |
| EP | 0 606 125 | 5/1997 |
| EP | 0 602 922 | 1/1998 |
| WO | WO 01/32718 | 5/2001 |

OTHER PUBLICATIONS

Abstracts of BE895019 published Mar. 1983, DE3241999 published May 1983, GB2111066 published Jun. 1983, and US4952649 published Aug. 1990, printed from Dialog Web.
Abstract of JP7316987 published Dec. 1995.
Abstract of JP52087486 published Jul. 1977.
Abstract of JP54040239 published Mar. 1979.
Abstract of JP58083006 published May 1983.
Abstract of JP63054004 published Mar. 1988.
Abstract of JP63191811 published Aug. 1988.
Abstract of JP63040711 published Feb. 1988.
Abstract of JP51136625 published Nov. 1976.
Abstract of KR9202488 published Jan. 1990.
Abstract of KR9300665 published Sep. 1990.
Abstract of JP7316986 published Dec. 1995.
Abstract of CA1040379 published Oct. 1978.
Tinkler et al., "Polymerisation of ethene by the novel titanium complex [Ti(Me$_3$SiNCH$_2$CH$_2$NsiMe$_3$)Cl$_2$]; a metallocene analogue," Chem. Commun., 1996, pp. 2623–2624.
Edelmann, "N–silylated benzamidines: versatile building blocks in main group and coordination chemistry," Coordination Chemistry Reviews, vol. 137, 1994, pp. 403–481.
Zhou et al., "Synthesis and Structure of Novel Bridged Dinuclear Indium Complexes," Inorg. Chem., 1996, vol. 35, pp. 1423–1424.
Zhou et al., "Bulky Amidinate Complexes of Tin(IV). Synthesis and Structure of Sn(RNC(R')NR)$_2$C2$_2$(R=Cyclohexyl, R'=H, Me; R=SiMe$_3$, R'=$^t$Bu)," Inorg. Chem., 1997, vol. 36, pp. 501–504.
Linden et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.
Stokes et al., "Reactions of Cobaloxime Anions and/or Hydrides with Enynes as a New, General Route to 1,3–and 1,2–Dienylcobaloxime Complexes," Organometallics, 1996, vol. 15, pp. 2624–2632.

Primary Examiner—David W. Wu
Assistant Examiner—Ling-Siu Choi
(74) Attorney, Agent, or Firm—Eric B. Meyertons

(57) ABSTRACT

The present invention relates to a method of homo- or co-polymerization of α-olefin by means of using a catalyst system which comprises the following components: (1) a solid complex titanium catalyst produced by means of a production method comprising the following steps: (a) preparing a magnesium compound solution by dissolving a magnesium halide compound and a compound of Group IIIA of the Periodical Table in a solvent of mixture of cyclic ester, one or more types of alcohol, a phosphorus compound, and an organic silane; (b) precipitating the solid particles by reacting said magnesium compound solution with a transitional metal compound, a silicon compound, a tin compound, or the mixture thereof; and (c) reacting said precipitated solid particles with a titanium compound and electron donors; (2) an organometallic compound of metal of Group IIIA of the Periodical Table; and (3) external electron donors comprising three or more types of organosilicon compounds, wherein the melt flow rates of the homopolymers obtained from polymerization by individually using said organo-silicon compounds under the same polymerization conditions are 5 or less, 5~20, and 20 or higher, respectively. According to the present invention, it has an advantage of obtaining polymers of broad molecular weight distribution with high hydrogen reactivity and melt flow rates while maintaining high stereoregularity and yields for olefin homo- or co-polymers during homo- or co-polymerization of α-olefin having three or more carbon atoms.

5 Claims, No Drawings

U.S. PATENT DOCUMENTS

| | | |
|---|---|---|
| 4,071,674 A | 1/1978 | Kashiwa et al. |
| 4,076,924 A | 2/1978 | Toyota et al. |
| 4,085,276 A | 4/1978 | Toyota et al. |
| 4,107,414 A | 8/1978 | Giannini et al. |
| 4,156,063 A | 5/1979 | Giannini et al. |
| 4,157,435 A | 6/1979 | Toyota et al. |
| 4,187,196 A | 2/1980 | Giannini et al. |
| 4,220,554 A | 9/1980 | Scatá et al. |
| 4,226,963 A | 10/1980 | Giannini et al. |
| 4,315,835 A | 2/1982 | Scatá et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,399,054 A | 8/1983 | Ferraris et al. |
| 4,401,589 A | 8/1983 | Kioka et al. |
| 4,439,540 A | 3/1984 | Cecchin et al. |
| 4,477,639 A | 10/1984 | Nielsen |
| 4,518,706 A | 5/1985 | Gessell |
| 4,613,655 A | 9/1986 | Longi et al. |
| 4,701,413 A | 10/1987 | Miyagawa et al. |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbé et al. |
| 4,988,656 A | 1/1991 | Arzoumanidis et al. |
| 4,990,479 A | 2/1991 | Ishimaru et al. |
| 5,013,702 A | 5/1991 | Arzoumanidis et al. |
| 5,059,570 A | 10/1991 | Bailly et al. |
| 5,061,667 A | 10/1991 | Murata et al. |
| 5,081,090 A | 1/1992 | Arzoumanidis et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,419,116 A | 5/1995 | Rast et al. |
| 5,459,116 A | 10/1995 | Ro et al. |
| 5,502,128 A | 3/1996 | Flores et al. |
| 5,585,317 A | 12/1996 | Sacchetti et al. |
| 5,587,440 A | 12/1996 | Ehlers et al. |
| 5,726,261 A | 3/1998 | Sacchetti et al. |
| 5,780,378 A | 7/1998 | Toida et al. |
| 5,844,046 A | 12/1998 | Ohgizawa et al. |
| 5,849,654 A | 12/1998 | Fushimi et al. |
| 5,968,862 A | 10/1999 | Abbott et al. |
| 6,066,702 A | 5/2000 | Ro et al. |

METHOD OF HOMO- OR CO-POLYMERIZATION OF α-OLEFIN

TECHNICAL FIELD

The present invention relates to a method of homo- or co-polymerization of α-olefins (hereinafter (co) polymerization), or more particularly to a method for producing olefin (co)polymers of high stereoregularity at a high rate of yields, while controlling the polymer's molecular weight distribution.

BACKGROUND OF INVENTION

In general, the olefin polymers produced with $MgCl_2$-supported catalysts have a narrow distribution of molecular weights. Many efforts have been made to broaden the distribution of molecular weights, so as to improve fluidity of the products produced by these catalysts at the time of processing. For this purpose, a method has been in wide use in which olefin polymers of different distributions of molecular weights are first made in each different polymerization reactor and later mixed, but this has disadvantages in that it requires much time and effort, and the product is often found to be very uneven. In a recent report from Mitsui Petrochemical of Japan (Korean Patent Publication No. 10-1993-000665), a method has been proposed in which olefin polymers with a wider distribution of molecular weights are produced by the use of two particular electron donors, from which homopolyolefins having a melt flow rate (MFR) of greater than 31.6 are respectively polymerized in the same polymerization conditions. In this case, however, the catalytic activity is too low to be commercialized, and not only is its molecular weight distribution difficult to control, but the hydrogen reactivity, which controls the molecular weight distribution of the polymers, is so low as to pose many limitations on the management of its processing.

Meanwhile, many other techniques of prior art are known to produce (co)polymers of high stereoregularity by the use of a solid complex titanium component containing at least magnesium treated with electron donors, and also titanium and a halogen, as a titanium catalyst for (co)polymerization of α-olefins which contains more than three atoms of carbon (for example Japanese Patent Laid-Open Nos. 73-16986 and 73-16987; German Patent Laid-Open Nos. 2,153,520, 2,230, 672, 2,230,728, 2,230,752, and 2,553,104).

These references reveal the use of mixture components of particular catalysts and the process for forming these catalysts. As is well known, the characteristics of these catalysts, containing solid complex titanium components, vary from catalyst to catalyst accordant with the different mixtures of components, different combinations of processes for formation, and different combinations of these conditions. Therefore, it is almost impossible to expect similar results from the catalysts produced under a given combination of conditions. Often, a catalyst having extremely defective properties is produced. When proper external electron donors are not used, it is also often true that such characteristics as catalytic activity or stereoregularity of polymers do not turn out to be adequate even though the catalyst is made under proper conditions.

The solid complex titanium component containing at least magnesium, titanium, and halogen is no exception. In (co) polymerization of α-olefins containing more than three atoms of carbon in the presence of hydrogen and with the use of a catalyst composed of titanium and an organometallic compound of metals belonging to Groups I through IV of the Periodic Table, if a catalyst composed of titanium trichloride obtained by reducing titanium tetrachloride using metallic aluminum, hydrogen, or an organic aluminum compound is used along with such electron donors as are known to suppress the formation of amorphous (co)polymers, the effects vary depending upon the electron donors used. The cause for this is accepted to be that the electron donors are not merely added, but rather they are combined with the magnesium and titanium compounds, electronically and sterically, thereby fundamentally altering the microstructure of the solid complex catalyst.

New methods for creating polymers of high stereoregularity with higher yields than the existing methods, by the use of certain silicone compounds, have been developed by Dow Corning of the U.S. (U.S. Pat. No. 5,175,332 and EP Laid-Open No. 602,922), Mitsui Petrochemical of Japan (Korean Patent Publication Nos. 10-1992-2488 and 10-1993-665; U.S. Pat. No. 4,990,479; EP Laid-Open No. 350,170A; Canadian Pat. No. 1,040,379), Samsung General Chemicals of Korea (Korean Patent Laid-Open No. 10-1998-082629), and other well-known European companies.

SUMMARY OF INVENTION

The objective of the present invention is to provide a method of producing olefin homo- or co-polymers of high stereoregularity with high yields, and the catalyst system used therein, while controlling the molecular weight distribution of olefin homo- or co-polymers, when applied to the production of olefin homo- or copolymers having more than three atoms of carbon.

Another objective of the present invention is to provide a method of producing polypropylene or propylene copolymers which are appropriate for use in production of films having sufficient heat-sealability, transparency, and anti-blocking properties, and which also are appropriate for injection molded products having superior strength, impact-resistance, fluidity and heat-sealability at low temperature.

DETAILED DESCRIPTION OF INVENTION

The method of (co)polymerization of α-olefins using a catalyst system includes the following components:

(1) a solid complex titanium catalyst prepared by means of a production method which includes the following steps:
   (a) preparing a magnesium compound solution by dissolving magnesium halide and a compound of Group IIIA of the Periodical Table in a solvent mixture of cyclic ether, one or more types of alcohol, a phosphorus compound, and an organic silane;
   (b) precipitating the solid particles by reacting said magnesium compound solution with a transition metal compound, a silicon compound, a tin compound, or mixtures thereof, and
   (c) reacting said precipitated solid particles with a titanium compound and electron donors;

(2) an organometallic compound of metal of Group IIIA of the Periodical Table; and (3) external electron donors containing three or more types of organo-silicon compounds, wherein the MFRs (Melt Flow Rate) of the homopolymers obtained at the time of polymerization using individual organo-silicon compounds under the same polymerization conditions are 5 or less, 5–20, and 20 or higher, respectively.

With respect to the catalyst system used in the method of (co)polymerization of α-olefin of the present invention, the method of producing said solid complex titanium catalyst is a method disclosed in Korean Patent Laid-Open No. 10-2000-009625, the content of which is incorporated herein in toto without specific references.

The solid complex titanium catalyst (1) used in the method of homo- or co-polymerization of α-olefin of the present invention has excellent catalytic activity, as compared with the conventional titanium catalysts, and is capable of producing polymers of high stereoregularity with a broad molecular weight distribution.

In step (a) of the method of producing said solid complex titanium catalyst (1), a magnesium compound may include non-reductive liquid magnesium compounds, for example, such magnesium halides as magnesium chloride, magnesium bromide, magnesium iodide, and magnesium fluoride; such alkoxymagnesium halides as methoxy magnesium chloride, ethoxymagnesium chloride, isopropoxymagnesium chloride, butoxymagnesium chloride, octoxymagnesium chloride; such aryloxymagnesium halides as phenoxymagnesium chloride and methylphenoxymagnesium chloride; such alkoxymagnesiums as ethoxymagnesium, isopropoxymagnesium, butoxymagnesium and octoxymagnesium; such aryloxymagnesiums as phenoxymagnesium and dimethylphenoxymagnesium; and such magnesium salts of carboxylic acid as laurylmagnesium and magnesium stearate. These magnesium compounds may be in the form of complex compounds, or in the form of a mixture with other metals. Moreover, a mixture of two or more magnesium compounds may also be used as said magnesium compound. Preferable magnesium compounds are the magnesium halides, such as magnesium chloride, alkoxymagnesium chloride, and aryloxymagnesium chloride, more preferably, alkoxymagnesium chloride and aryloxymagnesium chloride having a $C_1$–$C_{14}$ alkoxy group, or still more preferably, aryloxymagnesium chloride having a $C_5$–$C_{20}$ aryloxy group.

The magnesium compounds listed above can be generally represented by a simple general chemical formula, but some of magnesium compounds are difficult to be represented in this way depending on different production methods. In such cases, they are generally believed to be a mixture of these compounds. For instance, those compounds obtained by the following methods are all considered mixtures of a variety of compounds depending on the different reagents or the different degrees of reaction, and such compounds are also usable in the method described above: the method of reacting magnesium metals with alcohol or phenol in the presence of halosilane, phosphorus pentachloride, or thionyl chloride; the pyrolysis method of the Grignard reagent; the degradation method by using bonding hydroxyl, ester, ether groups or the like.

In an embodiment of the method, non-reductive liquid magnesium compounds or solutions of magnesium compounds in hydrocarbon solvents are mainly used. Such compounds can be produced by reacting the non-reductive magnesium compound listed above with at least one or more electron donors selected from the group consisting of alcohol, organic carboxylic acid, aldehyde, amines, or the mixtures thereof, in the presence or absence of a hydrocarbon solvent which can dissolve the magnesium compounds given above.

The hydrocarbon solvents used for the purpose include, for example, aliphatic hydrocarbons such as pentane, hexane, heptane, octane, decane, dodecane, and kerosene; an alicyclic hydrocarbons such as cyclopentane, methylcyclopentane, cyclohexane, and methylcyclohexane; such aromatic hydrocarbon as benzene, toluene, xylene, ethylbenzene, cumene, and cymene; and a halogenated hydrocarbon selected from the group such as dichloroethane, dichloropropane, dichloroethylene, trichloroethylene, carbon tetrachloride, and chlorobenzene.

In step (a) as above for the method of producing said solid complex titanium catalyst (1), the reaction of a magnesium halide compound and alcohol is performed preferably in a hydrocarbon solvent. This reaction is performed, depending on the types of magnesium halide compounds and alcohol used, at room temperature or higher, for example in the range from about 30° C. to 200° C., or more preferably about 60° C. to 150° C., for a duration in the range from about 15 minutes to 5 hours, or more preferably about 30 minutes to 3 hours. The electron donors in formation of a liquid magnesium compound include compounds having at least 6, or preferably 6 to 20 carbon atoms; for example, such aliphatic alcohols as 2-methylpentanol, 2-ethylbutanol, n-heptanol, n-octanol, 2-ethylhexanol, decanol, dodecanol, tetradecyl alcohol, undecenol, oleyl alcohol, and stearyl alcohol; such alicyclic alcohols as cyclohexanol and methylcyclohexanol; and such aromatic alcohols as benzyl alcohol, methylbenzyl alcohol, isopropyl benzyl alcohol, α-methylbenzyl alcohol, and α,α-dimethylbenzyl alcohol. For alcohols with five or fewer carbon atoms, methanol, ethanol, propanol, butanol, ethyleneglycol and methylcarbitol and the like can be used.

In step (b) as above for the method of producing said solid complex titanium catalyst (1), the magnesium compounds in liquid form, produced as above, are recrystallized into a solid component of globular form with the use of silicon tetrahalide, silicon alkylhalide, tin tetrahalide, tin alkylhalide, tin hydrohalide, titanium tetrahalide, and the like.

In step (c) as above of the method for producing said solid complex titanium catalyst (1), the titanium compound in liquid form to be reacted with a magnesium compound is preferably a tetravalence titanium compound of a general formula of $Ti(OR)_m X_{4-m}$ (wherein R is a hydrocarbon group, X a halogen atom, m a number of $0 \leq m \leq 4$). R represents an alkyl group of 1 to 10 carbon atoms. Various titanium compounds can be used; for example, titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(OC_4H_9)Cl_3$, $Ti(OC_2H_5)Br_3$, and $Ti(O(i-C_2H_5)Br_3$; alkoxytitanium dihalides such as $Ti(OCH_3)_2Cl_2$, $Ti(OC_2H_5)_2Cl_2$, $Ti(OC_4H_9)_2Cl_2$, and $Ti(OC_2H_5)_2Br_2$; alkoxytitanium halides such as $Ti(OCH_3)_3Cl$, $Ti(OC_2H_5)_3Cl$, $Ti(OC_4H_9)_3Cl$, and $Ti(OC_2H_5)_3Br$; and tetraalkoxytitanium mixtures such as $Ti(OCH_3)_4$, $Ti(OC_2H_5)_4$, and $Ti(OC_4H_9)_4$. Of these compounds, titanium tetrahalides, particularly titanium tetrachloride is preferred.

In step (c) as above for the method of producing said solid complex titanium catalyst (1), the examples of electron donors in general are as follows: oxygen-containing electron donors such as water, alcohol, phenol, ketone, aldehyde, carboxylic acid, ester, ether, and acid amide; nitrogen-containing electron donors such as ammonia, amine, nitrile, and isocyanate; and particularly, alcohols having 1 to 18 carbon atoms such as methanol, ethanol, propanol, pentanol, hexanol, octanol, dodecanol, octadecylalcohol, benzylalcohol, phenylethylalcohol, cumylalcohol, and isopropylbenzylalcohol; ketones having 6 to 15 carbon atoms, which can contain lower alkyl groups, such as phenol, cresol, xylene, ethylphenol, propylphenol, cumylphenol, and naphthol; aldehydes having 2 to 15 carbon atoms such as acetaldehyde, propionaldehyde, octylaldehyde, benzaldehyde, tolualdehyde, and naphtaldehyde; organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloro acetate, ethyl dichloro acetate, methyl methacrylate, ethyl crotonate, ethyl cyclohexyl carboxylate, phenyl benzoate, benzyl benzoate, methyl toluate, ethyl toluate, amyl toluate, ethyl ethyl benzoate, methyl anisate, ethyl anisate, ethyl ethoxybenzoate, γ-butyrolactone, δ-valerolactone, cumarin, phthalide, cyclohexyl acetate, ethyl propionate, methyl butyrate, methyl valerate, methyl chloroacetate, ethyl dichloroacetate, methyl methacrylate, ethyl cycloate, phenyl benzoate, methyl toluate, ethyl toluate, propyl benzoate, butyl benzoate, cyclohexyl benzoate, amyl toluate, ethylene carbonate, and ethylene carbonate; acid halide compounds having 2 to 15 carbon atoms such as acetyl chloride, benzyl chloride, chlorotoluate, and chloroanisate; acid amides such as methyl ether, ethyl ether, isopropyl ether, butyl ether, amyl ether, tetrahydrofuran, anisole, and diphenyl ether; amines such as methyl amine, ethyl amine, diethyl amine, tributyl amine, piperidine, tribenzyl amine, aniline, pyridine, pinoline, and tetramethyletheyelene diamine; nitriles such as acetonitrile, benzonitrile, and tolunitrile; and compounds of aluminum, silicon, tin, and the like, which have the above-said functional groups in their molecules. On the other hand, the catalysts reacted with certain electron donors are used to produce α-olefin polymers with improved stereoregularity and greater yields. The electron donors used to produce the catalysts herein are, in particular, ester derivatives of mono-ethylene glycol (MEG), diethylene glycol (DEG), triethylene glycol (TEG), polyethylene glycol (PEG), monopropylene glycol (MPG), and dipropylene glycol (DPG), such as acetate, propionate, n- and iso-butyrate, benzoate, toluate, etc. As examples of the above electron donors, the benzoates include monoethylene glycol monobenzoate, monoethylene glycol dibenzoate, diethylene glycol monobenzoate, diethylene glycol dibenzoate, diethylene glycol monobenzoate, triethylene glycol monobenzoate, triethylene glycol dibenzoate, monopropyl glycol monobenzoate, dipropylene glycol monobenzoate, dipropylene glycol dibenzoate, tripropylene glycol monobenzoate, and the like.

The polymers obtained through slurry polymerization by using the resultant solid catalysts are particles of granular or globular form of excellent particle size distribution, with high bulk density and good fluidity.

The aforesaid solid complex titanium catalyst (1) can be beneficially used in polymerization of such olefins as ethylene, propylene, and 1-butene or 4methyl-1-pentene. This catalyst can be especially used in the polymerization of α-olefins having three or more carbon atoms, the copolymerization thereof, copolymerization of α-olefins of three or more carbon atoms having ethylene of less than 10 mol %, and in the copolymerization of α-olefins of three or more carbon atoms with poly-unsaturated compounds such as conjugated or nonconjugated dienes.

The organometallic component (2) includes, in particular, trialkyl aluminums such as triethyl aluminum and tributyl aluminum; trialkenyl aluminum such as triisoprenyl aluminum; partly alkoxylated alkyl aluminums, for example, dialkylaluminum alkoxides such as diethylaluminum ethoxide and dibutylaluminum butoxide; alkylaluminum sesquihalides such as ethylaluminum sesquiethoxide and butylaluminum sesquiethoxide; alkylaluminum dihalide such as ethylaluminum dichloride, propylaluminum dichloride and butylaluminum dibromide; partly halogenated aluminum, for example, aluminum hydrides such as diethylaluminum hydride and dibutylaluminum hydride; dialkylaluminum hydrides such as dibutylaluminum hydride; and partly alkoxylated and halogenated alkyl aluminums such as ethylaluminum ethoxychloride, butylaluminum butoxychloride and ethylaluminum ethoxybromide.

In this method of (co)polymerization of α-olefins, the organosilicon compounds are used as external electron donors during the polymerization reaction to improve the stereoregularity of the produced polymers. The organosilicon compounds include ethyltriethoxysilane, n-propyl triethoxysilane, t-butyl triethoxysilane, vinyltriethoxysilane, diphenyldimethoxysilane, phenylmethyldimethoxysilane, bis p-tolyldimethoxysilane, p-tolylmethyldimethoxysilane, dicyclohexyldimethoxysilane, cyclohexyldimethyldimethoxysilane, 2-norbornanetriethoxysilane, 2-norbornanemethyldimethoxysilane, diphenyldiethoxysilane, etc., and organometallic compounds including cyclopentyl, cyclopentenyl, cyclopentadienyl groups or the derivatives thereof can be used.

In particular, as external electron donors (3), it is preferable to use dicyclopentyldimethoxysilane, cyclohexylmethyldimethoxysilane, and vinyltriethoxysilane. In such cases, the molar ratio of dicyclopentyldimethoxysilane is in the range of 0.05–0.7 of electron donors therein; the molar ratio of cyclohexylmethyldimethoxysilane is in the range of 0.2–0.9 of electron donors therein; and the molar ratio of vinyltriethoxysilane is in the range of 0.05–0.7 of electron donors therein. More preferably, the molar ratio of dicyclopentyldimethoxysilane is in the range of 0.05–0.5 of electron donors therein; the molar ratio of cyclohexylmethyldimethoxysilane is in the range of 0.2–0.6 of electron donors therein; and the molar ratio of vinyltriethoxysilane is in the range of 0.05–0.5 of electron donors therein.

The polymerization reaction can be performed in liquid or gaseous phase, but as the polymers produced with the use of the catalysts are of even granularity with high bulk density, it is more appropriate to use gaseous phase polymerization.

In liquid polymerization, such inactive solvents as hexane, heptane, and kerosene can be used as reaction mediums, but olefin itself may also serve as a reaction medium. In the case of liquid polymerization, the preferable concentration of the solid complex titanium catalyst (1) in the polymerization reaction system is about 0.001–5 mmols per liter of solvent, as measured in terms of titanium atoms, or more preferably about 0.001–0.5 mmol per liter of solvent. In the case of gaseous polymerization, also in terms of titanium atoms, concentrations from about 0.001–5 mmols, or preferably about 0.001 mmol to about 1.0 mmol, yet more preferably about 0.01–0.5 mmol per liter of solvent is used for polymerization. The ratio of organometallic atoms in component (2) is about 1–2,000 mols per mole of titanium atoms in said solid catalyst (1), or preferably about 5–500 mols. The ratio of electron donors (3), as calculated in terms of silicon atoms, is about 0.001–10 mols, preferably about 0.01–2 mol, or more preferably about 0.05–1 mol per mole of organometallic atoms in component (2).

The polymerization reaction using the catalyst is performed in the same way as in the conventional method where a Ziegler-type catalyst is used. Note that this reaction is performed substantially in the absence of oxygen and water. The olefin polymerization reaction is performed, preferably, at a temperature in the range of about 20–200° C., more preferably at about 50–180° C., and under pressure ranging from about atmospheric pressure to 100 atm, preferably from about 2–50 atm. The reaction can be performed either by batch, or semi-batch, or continuously, and can also be performed in two or more steps with different reaction conditions.

Below, the preferred embodiment will be shown in further detail through examples and comparative examples. Nonetheless, these examples and comparative examples are for illustrative purposes only, and is no way limited thereby.

EXAMPLE 1

Production of Solid Titanium Catalyst Component

The catalyst for polymerization of α-olefin was produced according to the method presented in Example 1 of Korean Patent Laid-Open No. 10-2000-0009625. The description of Korean Patent Laid-Open No. 10-2000-0009625, relating to the production of catalysts for polymerization of α-olefin, which are used in the present example, is hereby incorporated in toto herein without particular references thereto.

The particle size distributions of carriers and catalysts were measured by using a laser particle analyzer (Mastersizer X, Malvern Instruments). The compositions of carriers and catalysts were analyzed by ICP, and for surface area, the BET was used. The catalyst yields were determined in terms of the final weight of catalyst per weight of $MgCl_2$ initially placed therein. The particle size of the catalyst produced thereby was 50 μm, and included 3.1 wt % of Ti, 18.8 wt % of Mg, 250 ppm of Al, and 230 ppm of Si. The specific surface area was 241 $m^2/g$. The particle size distributions of the catalysts produced herein were $d_{10}$=33.6 μm, $d_{50}$=58.5 μm and $d_{90}$=97.1 μm, respectively. Here, $d_{10}$, $d_{50}$, and $d_{90}$ mean that 10, 50 and 90 percent of the particles, respectively, are smaller than 33.6 μm, 58.5 μm and 97.1 μm. $d_{50}$ is defined as the mid particle size.

The activities of the catalysts produced by said method were then measured after undergoing pre-polymerization and polymerization processes according to the following conditions:

Pre-polymerization

Placing 300 ml of n-hexyl and 6 mmol of triethylaluminum into a glass bottle containing 4 g of catalyst, the catalyst slurry therein was put into a 1-liter glass reactor maintained at 15° C. While adding propylene at 100 cc/min under 0.5 atm or below, the pre-polymerization was carried out for 100 minutes with stirring speed of 200 rpm. The degree of pre-polymerization of pre-polymers produced thereby was 3 g-PP/g-Cat.

Polymerization

A 2-liter autoclave was charged with 40 mg of pre-polymers, 7 ml of 1M triethylaluminum diluted in n-hexane (7 mmol, Al/Ti molar ratio=1,077), and 7 ml of 0.1M solution diluted with n-hexane (0.7 mmol, Si/Ti molar ratio=108) to the molar ratios of 0.2, 0.4 and 0.4, respectively, of cyclohexylmethyldimethoxysilane, dicyclopentyldimethoxysilane and vinyltriethoxysilane as external electron donors. The reactor was adjusted to atmospheric pressure with nitrogen. After placing 1,000 Nml of hydrogen into the reactor, 1,200 ml (600 g) of liquid propylene was added thereto. While stirring at 630 rpm, the temperature was raised to 70° C. The polymerization was carried out while maintaining the temperature at 70° C. for one hour. Then, the stirring was stopped, and while reducing the temperature to room temperature, the inside of the reactor was replaced with nitrogen, at which point, polymerization was complete.

The polymers produced as such were analyzed by using activities, the melt flow rate (MFR), NMR, RDS, DSC, etc., the results of which are shown in Table 1.

EXAMPLE 2

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.3, 0.35 and 0.35.

The polymers produced as such were analyzed by using activities, the melt flow rate (MFR), NMR, RDS, DSC, etc., the results of which are shown in Table 1.

EXAMPLE 3

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.4, 0.3 and 0.3.

The polymers produced as such were analyzed by using activities, the melt flow rate (MFR), NMR, RDS, DSC, etc., the results of which are shown in Table 1.

EXAMPLE 4

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.5, 0.25 and 0.25.

The polymers produced as such were analyzed by using activities, the melt flow rate (MFR), NMR, RDS, DSC, etc., the results of which are shown in Table 1.

EXAMPLE 5

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.6, 0.2 and 0.2.

The polymers produced as such were analyzed by using activities, the melt flow rate (MFR), NMR, RDS, DSC, etc., the results of which are shown in Table 1.

EXAMPLE 6

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.7, 0.15 and 0.15.

The polymers produced as such were analyzed by using activities, the melt flow rate (MFR), NMR, RDS, DSC, etc., the results of which are shown in Table 1.

EXAMPLE 7

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.8, 0.1 and 0.1.

The polymers produced as such were analyzed by using activities, the melt flow rate (MFR), NMR, RDS, DSC, etc., the results of which are shown in Table 1.

EXAMPLE 8

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.7, 0.15 and 0.15, and then 500 Nml of hydrogen was added thereto.

The polymers produced as such were analyzed by using activities, the melt flow rate (MFR), NMR, RDS, DSC, etc., the results of which are shown in Table 1.

EXAMPLE 9

The same solid titanium catalyst in Example 1 was used in the present example. Polymerization was carried out under the same conditions as those of Example 1, except that 7 ml of 0.1M solution (0.7 mmol, Si/Ti molar ratio=108), using cyclohexylmethyldimethoxysilane, dicyclopentyldimethoxysilane and vinyltriethoxysilane as external electron donors diluted with n-hexane, was incorporated into the polymerization process at respective molar ratios of 0.7, 0.15 and 0.15, and then 2,000 Nml of hydrogen was added thereto.

The polymers produced as such were analyzed by using activities, the melt flow rate (MFR), NMR, RDS, DSC, etc., the results of which are shown in Table 1.

The comparative examples below are provided to compare the properties of polymers obtained by using single or binary external electron donors with those of polymers obtained by using ternary external electron donors in examples.

Comparative Example 1

The same solid titanium catalyst in Example 1 was used in the present comparative example. Polymerization was carried out under the same conditions as those of Example 1, except that 7 ml of 0.1M solution (0.7 mmol, Si/Ti molar ratio=108), using cyclohexylmethyldimethoxysilane by itself as an external electron donor diluted with n-hexane, was incorporated into the polymerization process.

The polymers produced as such were analyzed by using activities, the melt flow rate (MFR), NMR, RDS, DSC, etc., the results of which are shown in Table 1.

Comparative Example 2

The same solid titanium catalyst in Example 1 was used in the present comparative example. Polymerization was carried out under the same conditions as those of Example 1, except that 7 ml of 0.1M solution (0.7 mmol, Si/Ti molar ratio=108), using dicyclopentyldimethoxysilane by itself as an external electron donor diluted with n-hexane, was incorporated into the polymerization process.

The polymers produced as such were analyzed by using activities, the melt flow rate (MFR), NMR, RDS, DSC, etc., the results of which are shown in Table 1.

Comparative Example 3

The same solid titanium catalyst in Example 1 was used in the present comparative example. Polymerization was carried out under the same conditions as those of Example 1, except that 7 ml of 0.1M solution (0.7 mmol, Si/Ti molar ratio=108), using vinyltriethoxysilane by itself as an external electron donor diluted with n-hexane, was incorporated into the polymerization process.

The polymers produced as such were analyzed by using activities, the melt flow rate (MFR), NMR, RDS, DSC, etc., the results of which are shown in Table 1.

Comparative Example 4

The same solid titanium catalyst in Example 1 was used in the present example. Polymerization was carried out under the same conditions as those of Example 1, except that 7 ml of 0.1M solution (0.7 mmol, Si/Ti molar ratio=108), using dicyclopentyldimethoxysilane and vinyltriethoxysilane as external electron donors diluted with n-hexane, was incorporated into the polymerization process at respective molar ratios of 0.5 and 0.5, and then 500 Nml of hydrogen was added thereto.

The polymers produced as such were analyzed by using activities, the melt flow rate (MFR), NMR, RDS, DSC, etc., the results of which are shown in Table 1.

Comparative Example 5

The same solid titanium catalyst in Example 1 was used in the present example. Polymerization was carried out under the same conditions as those of Example 1, except that 7 ml of 0.1M solution (0.7 mmol, Si/Ti molar ratio=108), using dicyclopentyldimethoxysilane and vinyltriethoxysilane as external electron donors diluted with n-hexane, was incorporated into the polymerization process at respective molar ratios of 0.5 and 0.5.

The polymers produced as such were analyzed by using activities, the melt flow rate (MFR), NMR, RDS, DSC, etc., the results of which are shown in Table 1.

Comparative Example 6

The same solid titanium catalyst in Example 1 was used in the present example. Polymerization was carried out under the same conditions as those of Example 1, except that 7 ml of 0.1M solution (0.7 mmol, Si/Ti molar ratio=108), using dicyclopentyldimethoxysilane and vinyltriethoxysilane as external electron donors diluted with n-hexane, was incorporated into the polymerization process at respective molar ratios of 0.5 and 0.5, and then 2,000 Nml of hydrogen was added thereto.

TABLE 1

Results of Polymerization Reactions Carried out with Various Composition Ratios of External Electron Donors

| | Conditions of Polymerization* | | | | | | | Results of Polymerization | | | | |
|---|---|---|---|---|---|---|---|---|---|---|---|---|
| | External Electron Donor (1) | | External Electron Donor (2) | | External Electron Donor (3) | | Amt of H₂ | | Stereo-regularity | Melt Flow | Tm | Hm | MWD* |
| Type | Comp. | MR* | Comp. | MR | Comp. | MR | (Nml) | Activity | (%, NMR) | Rate* | (° C.) | (° C.) | (PI). |
| E1* | CHMDMS | 0.2 | DCPDMS | 0.40 | VTES | 0.40 | 1,000 | 13.8 | 94.9 | 7.3 | 164.0 | 107.1 | 5.1 |
| E2 | CHMDMS | 0.3 | DCPDMS | 0.35 | VTES | 0.35 | 1,000 | 14.1 | 94.8 | 8.5 | 163.9 | 107.2 | 5.0 |
| E3 | CHMDMS | 0.4 | DCPDMS | 0.30 | VTES | 0.30 | 1,000 | 12.4 | 94.4 | 6.0 | 163.9 | 100.5 | 4.7 |
| E4 | CHMDMS | 0.5 | DCPDMS | 0.25 | VTES | 0.25 | 1,000 | 9.7 | 94.0 | 9.4 | 163.9 | 103.0 | 4.4 |
| E5 | CHMDMS | 0.6 | DCPDMS | 0.20 | VTES | 0.20 | 1,000 | 8.6 | 93.8 | 12.0 | 163.0 | 103.1 | 4.7 |
| E6 | CHMDMS | 0.7 | DCPDMS | 0.15 | VTES | 0.15 | 1,000 | 8.7 | 93.5 | 13.5 | 162.5 | 100.5 | 4.9 |
| E7 | CHMDMS | 0.8 | DCPDMS | 0.10 | VTES | 0.10 | 1,000 | 8.3 | 93.6 | 15.3 | 162.5 | 102.0 | 5.0 |
| E8 | CHMDMS | 0.7 | DCPDMS | 0.15 | VTES | 0.15 | 500 | 13.2 | 94.6 | 6.5 | 163.2 | 106.8 | 4.8 |
| E9 | CHMDMS | 0.7 | DCPDMS | 0.15 | VTES | 0.15 | 2,000 | 12.8 | 94.5 | 16.2 | 163.5 | 106.7 | 4.9 |
| CE1 | CHMDMS | 1.0 | — | — | — | — | 1,000 | 13.8 | 93.0 | 17.7 | 161.9 | 104.2 | 5.3 |
| CE2 | DCPDMS | 1.0 | — | — | — | — | 1,000 | 14.5 | 95.2 | 4.0 | 164.0 | 107.8 | 4.6 |
| CE3 | VTES | 1.0 | — | — | — | — | 1,000 | 4.6 | 91.0 | 30.0 | 161.8 | 102.5 | 5.6 |
| CE4 | DCPDMS | 0.5 | VTES | 0.5 | — | — | 500 | 7.2 | 93.7 | 4.7 | 164.0 | 105.2 | 4.8 |
| CE5 | DCPDMS | 0.5 | VTES | 0.5 | — | — | 1,000 | 8.5 | 94.0 | 5.0 | 164.0 | 107.2 | 5.1 |
| CE6 | DCPDMS | 0.5 | VTES | 0.5 | — | — | 2,000 | 10.0 | 93.5 | 7.0 | 161.2 | 104.8 | 5.3 |

*In the above table, the activities are expressed in terms of Kg-PP/g-Cat/h, and the melt flow rates in terms of g/10 minutes. Moreover, the following initials are used in the table:
Comp. Compound,
E Example,
CE Comparative Example,
MR: Molar ratio,
DCPDMS: dicyclopentyldimethoxysilane,
CHMDMS: cyclohexylmethyldimethoxysilane,
VTES: vinyltriethoxysilane, and
MWD: molecular weight distribution.
*Conditions of Polymerization: bulk polymerization, 40 mg of pre-polymerization catalysts (degree of pre-polymerization of 3g-PP/g-Cat.), 600 g of liquid propylene, 7 mmol of triethylalumium, 0.7 mmol of external electron donors, 70° C., and polymerization for one hour.

The method provided by the preferred embodiments described herein has the advantage of obtaining polymers of broad molecular weight distribution with high hydrogen reactivity and melt flow rate while maintaining high stereo-regularity and yields for olefin homo- or co-polymers during (co)polymerization of α-olefins having three or more carbon atoms.

Further modification and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of homo- or co-polymerization of α-olefin by means of using a catalyst system which comprises the following components:
   (1) a solid titanium catalyst produced by means of a production method comprising the following steps:
      (a) preparing a magnesium compound solution by dissolving a magnesium halide compound and a compound of Group IIIA of the Periodical Table in a solvent of mixture of cyclic ether, one or more alcohols, a phosphorus compound, and an organic silane;
      (b) precipitating solid particles by reacting said magnesium compound solution with a transition metal compound, a silicon compound, a tin compound, or the mixtures thereof; and
      (c) reacting said precipitated solid particles with a titanium compound and electron donors;
   (2) an organometallic compound of metal of Group IIIA of the Periodical Table; and
   (3) external electron donors comprising three or more organo-silicon compounds, wherein the melt flow rates of the homopolymers obtained from polymerization by individually using said organo-silicon compounds under the same polymerization conditions are 5 or less, 5~20, and 20 or higher, respectively.

2. The method of homo- or co-polymerization of α-olefin according to claim 1, wherein said organometallic compound is trialkyaluminum.

3. The method of homo- or co-polymerization of α-olefin according to claim 1, wherein said α-olefin is propylene, and said external electron donors are dicyclopentyldimethoxysilane, cyclohexylmethyldimethoxysilane, and vinyltriethoxysilane.

4. The method of homo- or co-polymerization of α-olefin according to claim 3, comprising dicyclopentyldimethoxysilane at a molar ratio of 0.05~0.7 of external electron donors, cyclohexylmethyldimethoxysilane at a molar ratio of 0.2~0.9 of external electron donors, and vinyltriethoxysilane at a molar ratio of 0.05~0.7 of external electron donors.

5. The method of homo- or co-polymerization of α-olefin according to claim 3, comprising dicyclopentyldimethoxysilane at a molar ratio of 0.05~0.5 of external electron donors, cyclohexylmethyldimethoxysilane at a molar ratio of 0.2~0.6 of external electron donors, and vinyltriethoxysilane at a molar ratio of 0.05~0.5 of external electron donors.

* * * * *

UNITED STATES PATENT AND TRADEMARK OFFICE
CERTIFICATE OF CORRECTION

PATENT NO.   : 6,559,250 B2
DATED        : May 6, 2003
INVENTOR(S)  : Ro et al.

It is certified that error appears in the above-identified patent and that said Letters Patent is hereby corrected as shown below:

Column 11,
Line 60, please delete "α-olefin" and substitute therefor -- α-olefins --

Column 12,
Line 36, please delete "a solvent of mixture of cyclic ether, one or more alcohols," and substitute therefor -- a solvent mixture of cyclic ether, one or more types of alcohol --
Line 43, please delete "the mixtures thereof" and substitute therefor -- mixtures thereof --
Line 47, please delete "three or more" and substitute therefor -- three or more types of --
Line 63, please delete "comprising" substitute therefor -- wherein the external electron donors comprise --
Lines 64, 66 and 67, please delete "of external" and substitute therefor -- of total external --

Column 13,
Line 2, please delete "comprising" and substitute therefor -- wherein the external electron donors comprise --
Line 13, please delete "of external" and substitute therefor -- of total external --

Column 14,
Lines 1 and 2, please delete "of external" and substitute therefor -- of total external --

Signed and Sealed this

Sixth Day of January, 2004

JAMES E. ROGAN
*Director of the United States Patent and Trademark Office*